(12) United States Patent
Claseman

(10) Patent No.: US 7,272,744 B2
(45) Date of Patent: Sep. 18, 2007

(54) METHOD FOR SIGNALING DURING A TRANSACTION AND RECEIVING UNIT AND SYSTEM FOR USE THEREWITH

(75) Inventor: George Claseman, Campbell, CA (US)

(73) Assignee: Micrel, Incorporated, San Jose, CA (US)

(*) Notice: Subject to any disclaimer, the term of this patent is extended or adjusted under 35 U.S.C. 154(b) by 496 days.

(21) Appl. No.: 10/850,126

(22) Filed: May 19, 2004

(65) Prior Publication Data

US 2005/0262363 A1   Nov. 24, 2005

(51) Int. Cl.
 *G06F 1/04* (2006.01)
 *G06F 1/12* (2006.01)
 *G06F 1/00* (2006.01)

(52) U.S. Cl. .................. 713/600; 713/400; 713/500
(58) Field of Classification Search ............... 713/600
 See application file for complete search history.

(56) References Cited

U.S. PATENT DOCUMENTS 5,459,453 A * 10/1995 Minerd et al. ............ 340/825

* cited by examiner

*Primary Examiner*—Rehana Perveen
*Assistant Examiner*—Stefan Stoynov
(74) *Attorney, Agent, or Firm*—Dorsey & Whitney LLP

(57) ABSTRACT

A transmitting device communicates a multi-level clock signal to a receiving device. Changes in the clock level may indicate the start or stop of a transmitting message or delineate fields in the transmitted message. The number of clock pulses received at a particular voltage may indicate further information about the message.

18 Claims, 2 Drawing Sheets

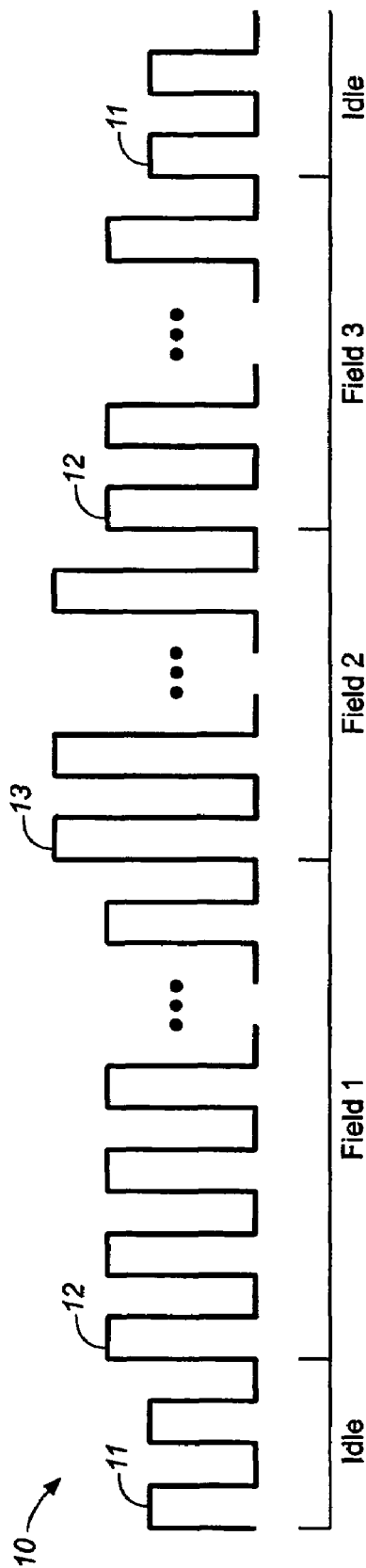
FIG._1
FIG._2

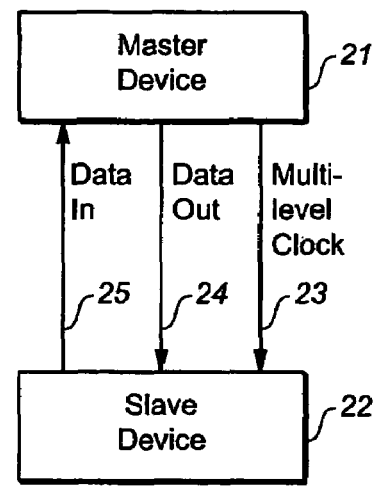
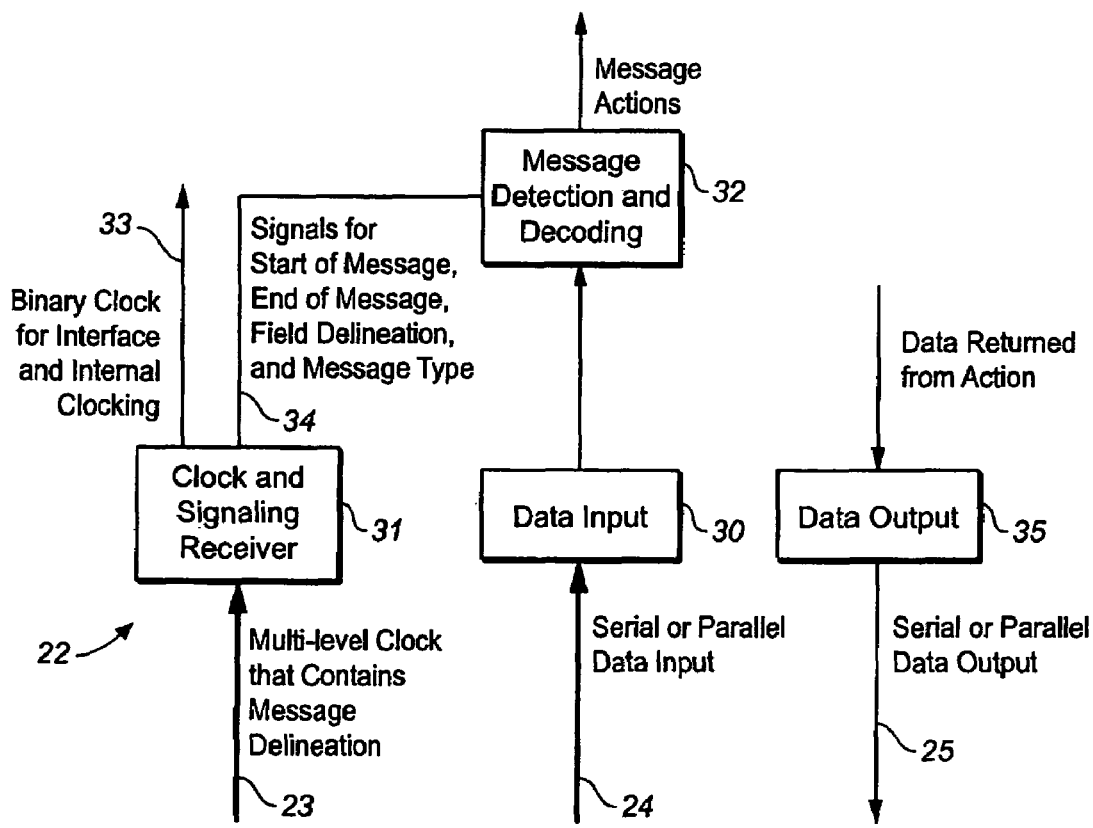

METHOD FOR SIGNALING DURING A TRANSACTION AND RECEIVING UNIT AND SYSTEM FOR USE THEREWITH

TECHNICAL FIELD

The present invention relates to interfaces and signaling, and more particularly, to signaling using a multi-level clock.

BACKGROUND OF THE INVENTION

Various interfaces and methodologies are presently available for communicating between electronic devices such as chips and hardware boards. Some of these methods have been adopted as industry standards. These interfaces typically use additional signal lines or coding as a signaling method from one device to the next, which consume extra input/output connections and/or bandwidth in the data stream.

For example, in some methods, a particular bit stream is sent that indicates the start or end of a message or that delineates fields within a message. This consumes extra bandwidth. In some methods, a separate signal line carries a signal indicative of the start or end of a message. This consumes an input/output connection of the device.

Accordingly, there is a need for a signaling method that is capable of indicating the start and end of a message but that minimizes the amount of additional bandwidth and/or input/output connections that are necessary to implement the method.

SUMMARY OF THE INVENTION

A method for communicating a transaction between a transmitting device and a receiving device is provided. A first clock signal is generated with a first voltage level. This first clock signal is transmitted to the receiving device. A message is prepared for sending during the transaction. A second clock signal with a second voltage level is generated. As the message is sent to the receiving device, the second clock signal is also sent to the receiving device such that the arrival of the second clock signal indicates the beginning of the message. In other embodiments, a change in clock level indicates a delineation between fields of the message. More than two clock levels may also be used.

A system for communicating a message from a transmitting device to a receiving device us provided. A transmitting device including a multi-level clock generator is coupled to the receiving device. The multi-level clock generator is operable to generate a first clock signal having a first voltage level and a second clock signal having a second voltage level. The transmitting device also includes a data output operable to transmit a message. The receiving device operates to receive the first clock signal and identify the first voltage level, receive the second clock signal and identify the second voltage level. Based on the voltage change between the first and second clock signals, the receiving device identifies the start of the message.

BRIEF DESCRIPTION OF THE DRAWINGS

FIG. 1 is a representation of a multi-level clock signal according to an embodiment of the present invention.

FIG. 2 is a representation of a multi-level clock signal according to another embodiment of the present invention.

FIG. 3 is a block diagram of a system according to an embodiment of the present invention.

FIG. 4 is a block diagram of a receiving device according to an embodiment of the present invention.

DETAILED DESCRIPTION OF PREFERRED EMBODIMENTS

Embodiments of the present invention utilize a physical signal to indicate the beginning and/or end of a message. Physical signals may also delineate between fields of a message, as shown in FIG. 1. FIG. 1 depicts a multi-level clock signal 10. A clock signal is typically sent between a transmitting device and a receiving device for synchronizing the devices during communication. As shown in FIG. 1, the voltage levels of the clock signal are used to convey information about the start and end of the message, as well as delineate fields in the message. At a first voltage level 11, the clock signal indicates that the connection is idle, and no message is in transmission. At a second voltage level 12, the clock signal indicates the start of a message. This may also indicate the beginning of a first field in the message. At a third voltage level 13, the clock signal indicates the beginning of a second field in the message. By returning to the second voltage level 12, the clock signal indicates the beginning of a third field in the message. By returning to the first voltage level 11, the clock signal indicates the end of the message. Although three voltage levels are shown in FIG. 1, it is to be understood that a fewer or greater number of levels may also be used—including 2, 4, 5, 6, 7, 8, 9, and 10 levels. The number of levels implemented generally depends on the types of field delineators desired and the ability of the receiving circuitry to discern between the voltage levels.

Each of the different fields shown in FIG. 1 may contain a different type of information, such as header and data information, address information, forward error correction information, and the like.

Multi-level clock signal 40, shown in FIG. 2 further uses the number of clock pulses sent at a particular voltage level to indicate information about a message. At the first voltage level 11, the clock signal indicates the connection is idle and no message is in transmission. A plurality of voltage pulses are sent at the second voltage level 12 to indicate a start of a message. The number of clock pulses sent at the voltage level 12 is indicative of the type of message being transmitted. Message types may include for example, discovery messages, normal transactions, and diagnostic transactions. Discovery transactions may be used to find out how many units are in communication with the transmitting device, and what types of devices they are. Normal transactions may include any of a variety of read, write, and/or control functions. Diagnostic transactions may be used for board or chip-level problem detection. In some embodiments, the transaction is the clock signal itself. For example, in some embodiments, a particular clock signal level is itself a message, such as a reset command in one embodiment. The number of clock pulses sent at the voltage level 12 may also indicate a particular field of the message being sent. The voltage level 12 may be higher or lower than the voltage level 11. During transmission of the message or field indicated by the clock pulses at the voltage level 12, clock pulses having the voltage level 11 are transmitted. A single pulse at the voltage level 12 indicates an end of the message, and the clock pulses return to the voltage level 11 indicative of an idle state.

Accordingly, the voltage level and number of clock pulses transmitted at a particular voltage level may be used to indicate a start and stop of a message, as well as to delineate fields within the message or to convey information regarding the message's type.

A system implementing methods according to the present invention includes a transmitting device 21 and a receiving device 22, as shown in FIG. 3. Although only a single receiving device is shown in FIG. 3, in other embodiments the transmitting device is in communication with a plurality of receiving devices. A single receiving device may also receive data from a plurality of transmitting devices. The transmitting device 21 transmits a multi-level clock signal 23 and a data signal 24 to the receiving device 22. Although the data signal 24 and the multi-level clock signal 23 are shown separately in FIG. 3, the two signals may be carried over the same connection. The receiving device 22 may also send a data signal 25 to the transmitting device.

The receiving device 22 includes a data input 30 for receiving the data signal 24 and a clock receiver 31 for receiving the multi-level clock signal 23, as shown in FIG. 4. The clock receiver 31 outputs a binary clock 33 for interface and internal clocking as well as a delineation signal 34 indicative of a change in level of the clock signal 23. The clock receiver 31 may also function as a clock to devices that have no other clock resource for internal operations. The delineation signal as well as the data received by the data input 30 are coupled to a message detection and decoding block 32. Using the delineation signals 34, the message detection block 32 is able to detect the start and stop of a message, as well as delineate between fields of the message. Actions and/or information present in the message are then distributed by the message detection block 32 to other units within the receiving device 22 as necessary. Data returned responsive to the message is sent to a data output 35 and communicated to the transmitting device as the data signal 25. Although the input block 30 is shown separate from the output block 35 in FIG. 4, bidirectional input/output blocks may also be used.

Generally, embodiments of the present invention may use clock signals as shown in FIG. 1 and/or in FIG. 2. In some embodiments, the clock signal 10 in FIG. 1 is used in systems having a single transmitting device and a single receiving device where the signaling information correlates with the data in the stream. While the clock signal 10 in FIG. 1 may be used in a system having a plurality of transmitting devices and/or a plurality of receiving devices, in some embodiments a system having a plurality of receiving devices utilizes the multi-level clock signal 40 in FIG. 2. The multi-level clock signal 40 may indicate the type of transaction to a plurality of receiving devices, such that each device operates correctly when the transaction begins.

The systems and methods described advantageously allow devices employing old and new technologies to mix. Through use of a physical signal to indicate a delineation, devices may explicitly determine the start and stop of a message, as well as fields within the message. In this manner, fields that are not used by a particular device may be discarded. For example, in one embodiment, a message includes a first address field, a second error correction field, and a third data field. The transmitting device sends the first address field along with a clock signal having a first level, the second error correction field with a clock signal having a second level, and the third data field with a clock signal having a third level. The third level may be a return to the first level. In this manner, a receiving device unable to implement the error correction in this position may discard it. Further, no advanced knowledge of a particular bit pattern that indicates a start or stop need be known.

Further, connected devices may remain continuously synchronous using methods of the present invention. That is, a clock signal may be continuously provided to the receiving device by the transmitting device. This removes or lessens the need to resynchronize the devices at a beginning of a transaction and may provide a clock to devices that have no other clock resource for internal operations.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for delineating a transaction between a transmitting device and a receiving device, the method comprising:

generating a first clock signal with a first voltage level;

transmitting said first clock signal with the first voltage level to the receiving device;

preparing a message for sending during the transaction;

generating a second clock signal with a second voltage level and a plurality of clock pulses;

transmitting the second clock signal with the second voltage level to the receiving device such that the second clock signal with the second voltage level indicates the beginning of the message; and sending the message to the receiving device, wherein the message has a message type and the number of clock pulses transmitted at said second voltage level indicates said message type.

2. A method according to claim 1, further comprising:

transmitting the first clock signal with the first voltage level to the receiving device again after transmitting the message to indicate the end of the message.

3. A method according to claim 1, further comprising transmitting the first clock signal having the first voltage level again during transmission of the message and transmitting the second clock signal having the second voltage level again after transmission of the message to indicate an end of the message.

4. A method according to claim 1, wherein the message comprises a plurality of fields including a first field and a second field, the method further comprising:

generating a third clock signal with a third voltage level; and after transmitting the first field, transmitting the third clock signal to the receiving device and simultaneously transmitting the second field such that the third clock signal with the third voltage level indicates the beginning of the second field.

5. A method according to claim 4, wherein said first field contains information regarding forward error correction.

6. A method for use with a clock signal having a voltage level to interpret a message from a transmitting device received by a receiving device, the method comprising:

receiving the clock signal having the voltage level;

detecting a change in the voltage level of the clock signal from a first voltage level to a second voltage level;

identifying a beginning of the message based on the change in the voltage level of the clock signal; and identifying a number of clock pulses received at said second voltage level and identifying a type of the message based on the number of clock pulses received at the second voltage level.

7. A method according to claim 6, further comprising:
detecting a second change in the voltage the clock signal; and
identifying an end of the message based on the second change in the voltage level of the clock signal.

8. A method according to claim 6, further comprising:
detecting a second change in the voltage level of the clock signal; and
identifying a beginning of a field of the message based on the second change in the voltage level of the clock signal.

9. A method according to claim 8 wherein said field contains forward error correction information.

10. A receiving device for use with a clock signal having a voltage level and a message, the receiving device comprising:
a clock receiver operable to receive the clock signal having the voltage level;
a data input operable to receive the message;
a message detection block coupled to the clock receiver and the data input operable to detect a first change in the voltage level of the clock signal from a first voltage level to a second voltage level and identify a start of the message based on the first change in the voltage level of the clock signal; and
wherein the clock receiver is further operable to identify the number of clock pulses received at said second voltage level and identify a type of the message based on the number of clock pulses received at the second voltage level.

11. A receiving device according to claim 10, wherein the clock receiver is further operable to generate a binary clock signal and a start of message signal based on said received clock signal.

12. A receiving device according to claim 10, wherein the clock receiver is further operable to detect a second change in the voltage level of the clock signal and generate a field signal indicative of a field of the message based on the second change in the voltage level.

13. A system for communicating a message from a transmitting device to a receiving device, the system comprising:
a transmitting device including a multi-level clock generator operable to generate a clock signal having a voltage level and including a data output operable to transmit a message;
a receiving device coupled to the transmitting device and operable to receive the clock signal having the voltage level and to detect a first change in the voltage level of the clock signal from a first voltage level to a second voltage level and identify a start of the message based on the first change in the voltage level of the clock signal; and
wherein the receiving device is further operable to identify the number of clock pulses received at said second voltage level and identify a type of the message based on the number of clock pulses received at the second voltage level.

14. A system according to claim 13, further comprising a serial connection for coupling the receiving device to the transmitting device.

15. A system according to claim 13, further comprising a parallel connection for coupling the receiving device to the transmitting device.

16. A system according to claim 13, wherein the receiving device is further operable to detect a second change in the voltage level of the clock signal to identify a beginning of a field of the message based on the identification of the second voltage change.

17. A method for delineating a transaction between a transmitting device and a receiving device, the method comprising:
generating a first clock signal with a first voltage level;
transmitting said first clock signal with the first voltage level to the receiving device;
preparing a message having first and second fields for sending during the transaction;
generating a second clock signal with a second voltage level;
transmitting the second clock signal with the second voltage level to the receiving device such that the second clock signal with the second voltage level indicates the beginning of the first field of the message;
sending the first field of the message to the receiving device;
generating a third clock signal with a third voltage level; and
after transmitting the first field of the message, transmitting the third clock signal to the receiving device and simultaneously transmitting the second field of the message such that the third clock signal with the third voltage level indicates the beginning of the second field of the message.

18. A method according to claim 17, wherein said first field of the message contains information regarding forward error correction.

* * * * *